(12) United States Patent
James

(10) Patent No.: US 11,474,514 B2
(45) Date of Patent: Oct. 18, 2022

(54) REMOTELY CONTROLLED MULTIROTOR AIRCRAFT CONTROLLED BY HUMAN VOICE

(71) Applicant: Saronikos Trading and Services, Unipessoal LDA, Madeira (PT)

(72) Inventor: Robert James, Hatfield (GB)

(73) Assignee: Saronikos Trading and Services, Unipessoal LDA, Madeira (PT)

( * ) Notice: Subject to any disclaimer, the term of this patent is extended or adjusted under 35 U.S.C. 154(b) by 437 days.

(21) Appl. No.: 16/639,011

(22) PCT Filed: Aug. 15, 2017

(86) PCT No.: PCT/IB2017/054960
§ 371 (c)(1),
(2) Date: Feb. 13, 2020

(87) PCT Pub. No.: WO2019/034909
PCT Pub. Date: Feb. 21, 2019

(65) Prior Publication Data
US 2020/0225656 A1 Jul. 16, 2020

(51) Int. Cl.
*G05D 1/00* (2006.01)
*B64C 39/02* (2006.01)
(Continued)

(52) U.S. Cl.
CPC ......... *G05D 1/0016* (2013.01); *B64C 39/024* (2013.01); *G05D 1/101* (2013.01);
(Continued)

(58) Field of Classification Search
CPC .... G05D 1/0016; G05D 1/101; B64C 39/024; B64C 2201/027; B64C 2201/042;
(Continued)

(56) References Cited

U.S. PATENT DOCUMENTS 9,489,937 B1 11/2016 Beard et al.

FOREIGN PATENT DOCUMENTS

WO 2016/118626 A1 7/2016

OTHER PUBLICATIONS

Voice Frequency, Wikipedia, Jul. 2, 2017, https://en.wikipedia.org/w/index.php?title=Voice_frequency&oldid=788659530.
(Continued)

*Primary Examiner* — Mathew Franklin Gordon
(74) *Attorney, Agent, or Firm* — Workman Nydegger

(57) ABSTRACT

A multi-rotor remote control aircraft for capturing audio and/or video signals and a method for remote controlling the aircraft by way of voice commands. The aircraft and method mitigate the effects of audio noise produced by motors and propellers on reception and detection of the voice commands. Audio acquisition components are provided for receiving the voice commands while noise acquisition components are devoted for capturing the environmental noise. The mitigation of the noise effects is achieved by filtering and a cancellation technique. With the cancellation technique, the noise part contained in the signal captured by the noise acquisition components is equalized to the noise part contained in an audio signal carrying the voice commands and then it is subtracted from the audio signal.

19 Claims, 4 Drawing Sheets

(51) Int. Cl.
   *G05D 1/10*      (2006.01)
   *G10L 15/22*     (2006.01)
   *G10L 21/0232*   (2013.01)
(52) U.S. Cl.
   CPC .......... *G10L 15/22* (2013.01); *G10L 21/0232* (2013.01); *B64C 2201/027* (2013.01); *B64C 2201/042* (2013.01); *B64C 2201/108* (2013.01); *B64C 2201/146* (2013.01); *G10L 2015/223* (2013.01)
(58) Field of Classification Search
   CPC ........ B64C 2201/108; B64C 2201/146; G10L 15/22; G10L 21/0232; G10L 2015/223
   See application file for complete search history.

(56) References Cited

OTHER PUBLICATIONS

Yoon, Sojeong et al., Advanced Sound Capturing Method with Adaptive Noise Reduction System for Broadcasting Multicopters, XP32749817A, IEEE International Conference on Consumer Electronics (ICCE), 2015, 26-29.
International Search Report dated Apr. 24, 2018, issued in PCT Application No. PCT/IB2017/054960, filed Aug. 15, 2017.
Written Opinion dated Apr. 24, 2018, issued in PCT Application No. PCT/IB2017/054960, filed Aug. 15, 2017.

REMOTELY CONTROLLED MULTIROTOR AIRCRAFT CONTROLLED BY HUMAN VOICE

FIELD OF THE INVENTION

The present invention relates to a multi-rotor remote control aircraft for capturing audio and/or video signals and a method for remote controlling said aircraft.

BACKGROUND

A multi-rotor aircraft (like a bicopter, a tricopter, a quadcopter, a hexacopter, an octocopter or the like) is inherently unstable, so it requires a constant engine speed adjustment to maintain the orientation set by the pilot and/or by the flight control system.

Speed adjustment is usually carried out by special regulators (such as Proportional, Integral and Derivative regulators—in short PIDs) acting separately on each of the three axes of rotation (pitch, roll and yaw) of the aircraft, so as to maintain angular rotational speeds along these axes as near as possible to the values selected by the pilot through a remote control device such as a remote control, a radio control or the like, and/or by the flight control system.

The awkward operation of this remote control device, typical of inexperienced pilots, inevitably causes security problems and/or oscillations of the aircraft, which make it difficult to control the aircraft and to take pictures, since under certain exposure conditions the photos and the videos captured by the video capture media are affected by wobble, also known as 'Jello' effect, when sensors are equipped with Rolling Shutters.

Therefore, for this kind of aircrafts, there is a need to have a remote control, easy to use and allowing inexperienced users to avoid abrupt movements of the aircraft. Regular radio control devices are in fact complex to use and require some training. Moreover, they have to be carried together with the aircraft and are a burden for the user.

SUMMARY OF THE INVENTION

The present invention aims to solve these and other problems by providing a voice control method whereby the user can control the aircraft by voice commands using words of common language, such as "forward", "back", "right", "left", "stop" or "turn to the left", "rotate to the right", "slide to the left", "slide to the right" or the like. Accordingly, the aircraft comprises audio acquisition means adapted to receive an audio signal carrying the user's voice, and speech conversion means for converting voice commands into flight control signals. This audio acquisition means can be preferably set to recognize speech in different languages, one of them being selected by the aircraft's user.

However, the aircraft motors and their propellers produce audio noise that may affect the entire voice band. In fact, the harmonics of the propeller/motor shaft rate and the blade passing frequency have very high amplitudes up to the fifth harmonic of the shaft rate (see Experimental Study of Quadcopter Acoustics and Performance at Static Thrust Conditions, by W. Nathan Alexander et al., Aeroacoustics Conferences, 30 May-1 Jun. 2016, Lyon, France, 22nd AIAA/CEAS Aeroacoustics Conference). Therefore, the fifth harmonic of the shaft rate of 18,000 RPM (300 Hz) has a frequency of 1,500 Hz, which is in the core of the band 300 Hz to 3400 Hz used for instance in communication for the telephony voice service (see https://en.wikipedia.org/wiki/Voice frequency).

In order to reduce the energy of the unwanted noise components affecting the voice signal, the invention teaches two complementary techniques: filtering out from the voice signal the noise components by means of stopband filters, and cancelling the noise components by means of a cancellation technique. Preferably, the filtering technique is used for attenuating the unwanted components that are not in the core of the voice band, while the cancellation technique can be used also for frequencies that are inside the voice band.

Both techniques exploit the presence, in the environmental noise, of tones related to the shaft rate of the aircraft motors. They allow the identification of the frequencies of noise components to be removed and the assessment of the general characteristics of the noise.

The shaft rate of the aircraft motors may be derived from the motors control signals or from a spectral analysis of the audio signal. For a better and easier identification of the environmental noise components, dedicated acquisition means may be used to pick up a noise signal with a minimum component of the user's voice signal.

In the case of the cancellation technique, narrow passband filters may be used with their passband centered around the frequencies of unwanted components (shaft rates, harmonics of the shaft rates, and others), for extracting corresponding signal components from the noise signal and the audio signal. Each signal component extracted from the noise signal is then compared against the corresponding one extracted from the audio signal, and data of relative amplitude, phase, and delay are computed. With those data, a transfer function is defined for a filter equalizing and aligning the noise part contained in the noise signal to the noise part contained in the audio signal. Then the noise signal, processed by said transfer function, is subtracted from the audio signal.

In this way, on board the aircraft it is possible to acquire audio signals carrying voice commands and translate the voice commands into control signals for the flight control means.

Further advantageous features of the present invention are set forth in the attached claims.

BRIEF DESCRIPTION OF THE DRAWINGS

These features and further advantages of the present invention will become more apparent from the description of an embodiment thereof, shown in the accompanying drawings, provided purely by way of non-limiting example, wherein.

DETAILED DESCRIPTION OF THE INVENTION

In this description, any reference to "an embodiment" will indicate that a particular configuration, structure or feature described in regard to the implementation of the invention is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for simplicity sake, and do not limit the protection scope or extension of the various embodiments.

Figure 1:
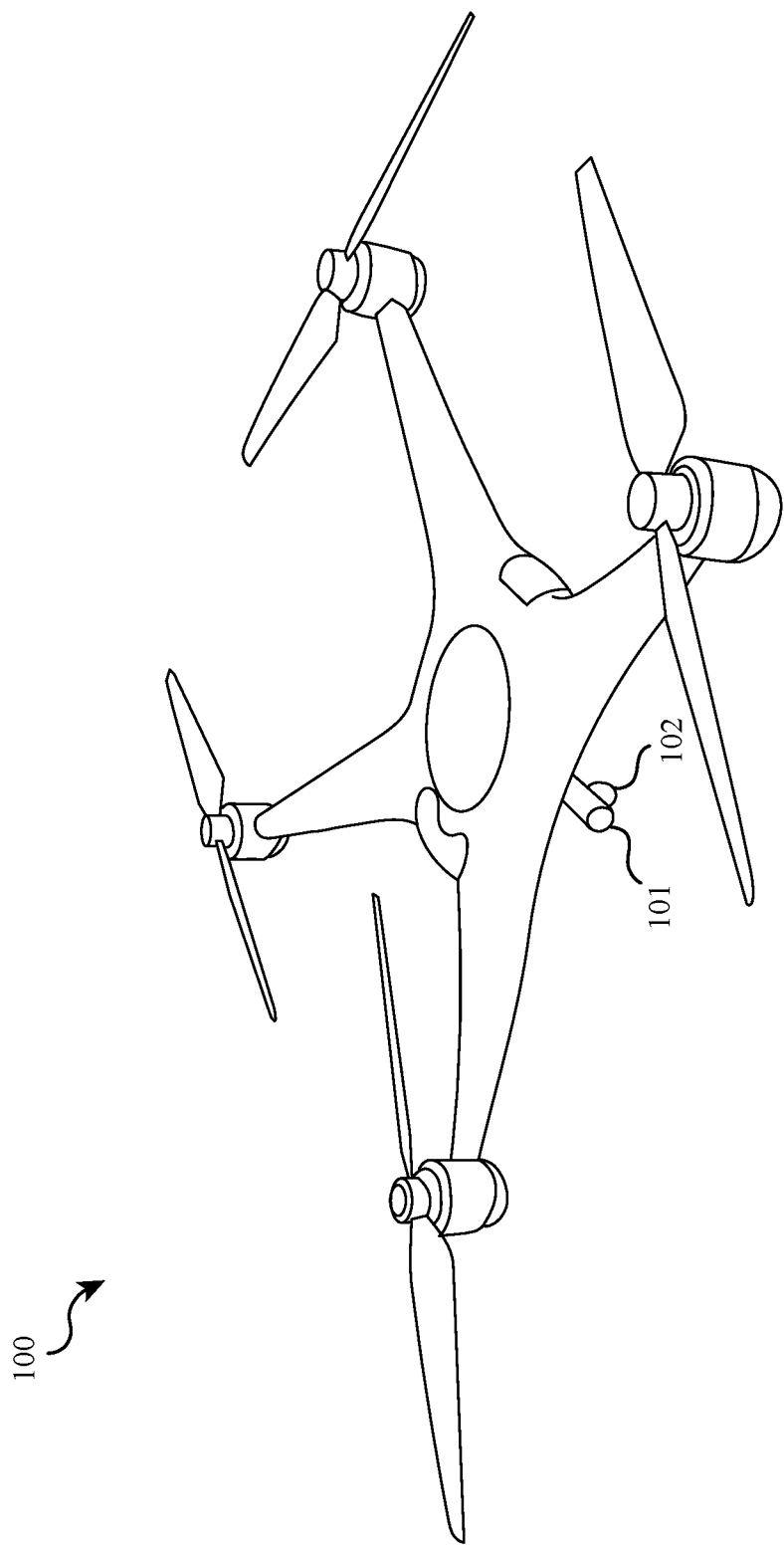
FIG. 1 shows a perspective view of a multi-rotor aircraft equipped with sound acquisition means.

FIG. 1 shows a perspective view of a multi-rotor aircraft 100 equipped with two kind of sound capturing means: audio acquisition means 101 adapted to receive an audio signal carrying a control command for the aircraft 100, and noise acquisition means 102 for receiving a noise signal coming from the environment surrounding the aircraft 100.

The audio acquisition means 101 may be a microphone or a set of microphones designed for capturing the voice of the aircraft user. They may have directional properties for picking up sound predominantly from one direction, in particular from the direction where the aircraft user is located. Preferably, the audio acquisition means 101 may be implemented by an array of sensing elements in conjunction with beamforming algorithms, whose pointing direction can be controlled by a control signal. Moreover, the aircraft 100 may be equipped with voice source localization means, configured for calculating the direction from which the audio signal, carrying the user's voice, comes.

The voice source localization means may operate by processing the signals captured by the sensing elements of the audio acquisition means 101. They, however, may also utilize other sensing elements, possibly in combination with those of the audio acquisition means 101. With the computed direction from which the user's voice comes, the voice source localization means issue a control signal for the acquisition means (101) to point their beam in said calculated direction.

MEMS (MicroElectro-Mechanical Systems) sensing elements may be used to implement small, high-performance microphones with high dynamic range. However, the skilled person may suggest other technologies and other structure, for implementing the audio acquisition means 101 and the voice localization means without departing from the teaching of the present invention.

The noise acquisition means 102 may be a microphone or a set of microphones and/or vibration sensors, and are configured for capturing the environmental noise.

Both the audio acquisition means 101 and the noise acquisition means 102 capture the voice of the aircraft user and the environmental noise, but with different relative levels and characteristics. Analyzing these differences, it is possible to distinguish the voice components from the noise components and subtract the noise components from the audio signal so as to obtain an audio signal sufficiently clean for reliably detecting simple voice commands.

Figure 2:
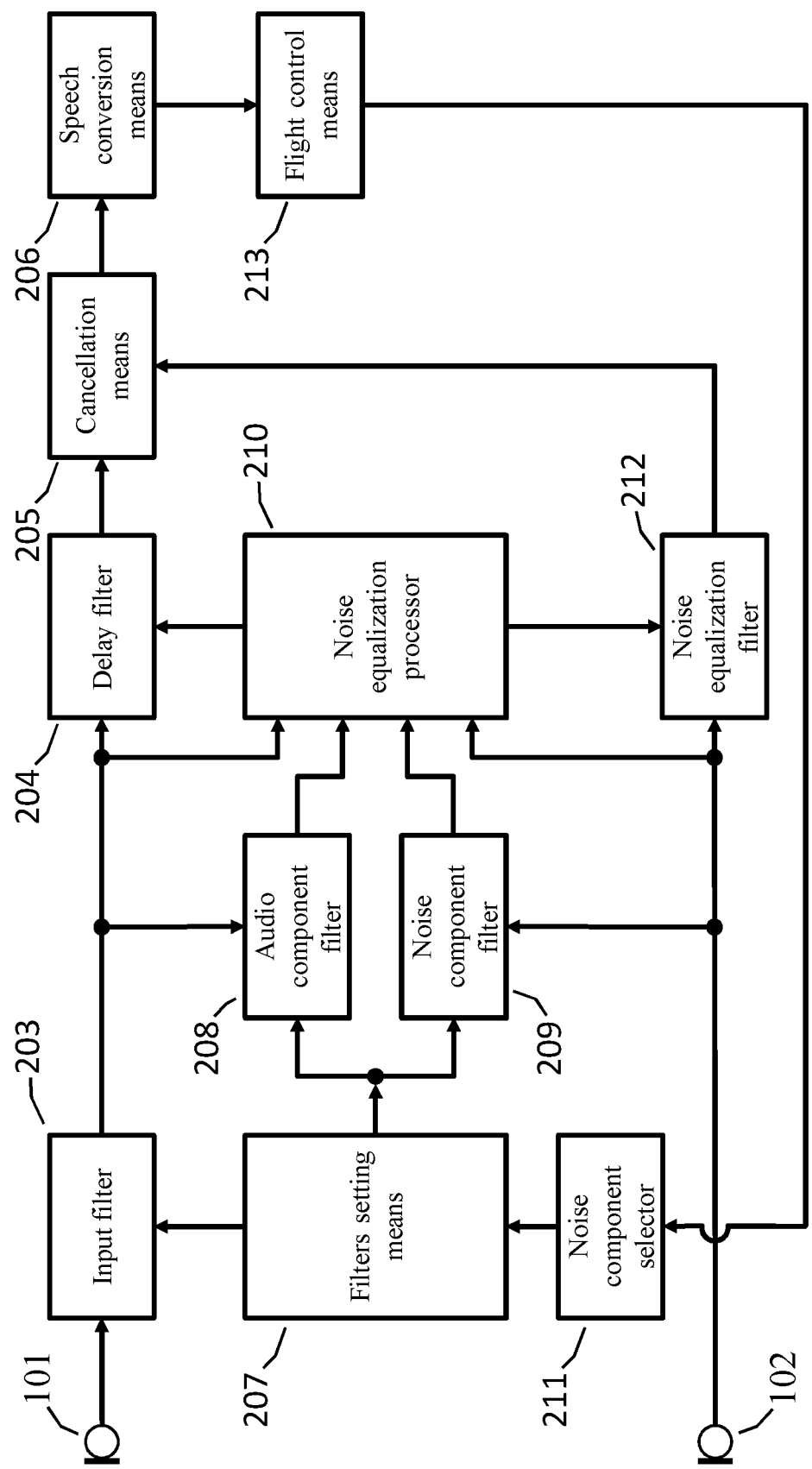
FIG. 2 shows block diagram of noise reduction means comprised in a voice-controlled aircraft according to the invention.

The assembly 200 for performing these functions is now described also with reference to FIG. 1 and FIG. 2, considering that the multi-rotor aircraft 100 is preferably equipped with at least a first motor (preferably four), which can be controlled by a motor control signal and coupled to a first propeller, capable of generating a thrust for making the aircraft 100 flying, flight controls means 213, such as a PixHawk® model unit produced by 3D Robotics, adapted to receive a command signal defining an attitude and/or movement and/or direction of the aircraft, and issue at least one control signal for controlling the flight of the aircraft, by means of said at least first motor, on the basis of said control signal.

the audio acquisition means 101, such as a microphone coupled to an analog-to-digital conversion unit (ADC), capable of acquiring an audio signal carrying an audio command for the aircraft 100;

the noise acquisition means 102 apt to receive a noise signal coming from the environment surrounding the aircraft 100;

an input filter 203 for, such as a high pass filter and/or bandpass filter, a notch filter, a Finite Impulse Response (FIR) or Infinite Impulse Response (IIR) filter or other, for filtering the audio signal carrying an audio command and in particular for reducing the energy of a noise component in a first frequency band;

a delay filter 204 for possibly delaying the filtered audio signal coming out from the input filter 203 on the basis of a delay datum set by the noise equalization processor 210;

cancellation means 205 adapter to subtract from the filtered audio signal a noise component so as to cancel the noise component from the audio signal;

speech conversion means 206 apt to convert an audio signal carrying an audio command into a command signal for the flight control means 213;

filter setting means 207 adapter to set parameters defining stopband or passband filters, comprising multiband filters, on the basis of reference frequency data received at its input from a noise component selector 211;

audio component filter 208, implementing a passband filter or a multi-bandpass filter specified by filter setting means 207, for extracting signal components from the audio signal;

noise component filter 209, implementing a passband filter or a multi-bandpass filter specified by filter setting means 207, for extracting signal components from the noise signal;

noise equalization processor 210, such as a CPU or a set of CPUs, preferably operating in a programmable manner and executing specific instructions, configured for setting data defining a delay and a noise equalization transfer function of a filter equalizing the noise part of a signal component extracted from a noise signal to the noise part of a signal component extracted from an audio signal, on the basis of said extracted components and/or said noise signal and/or said audio signal;

noise component selector 211 configured for setting at least one reference frequency of a noise component of the noise signal, on the basis of at least one motor control signal received from the flight control means 213, representing the rotation rate of said first motor, and/or on the basis of an analysis of the noise signal;

equalization filter (212) configured for implementing the noise equalization filter transfer function set by the noise equalization processor (210).

Figure 3:
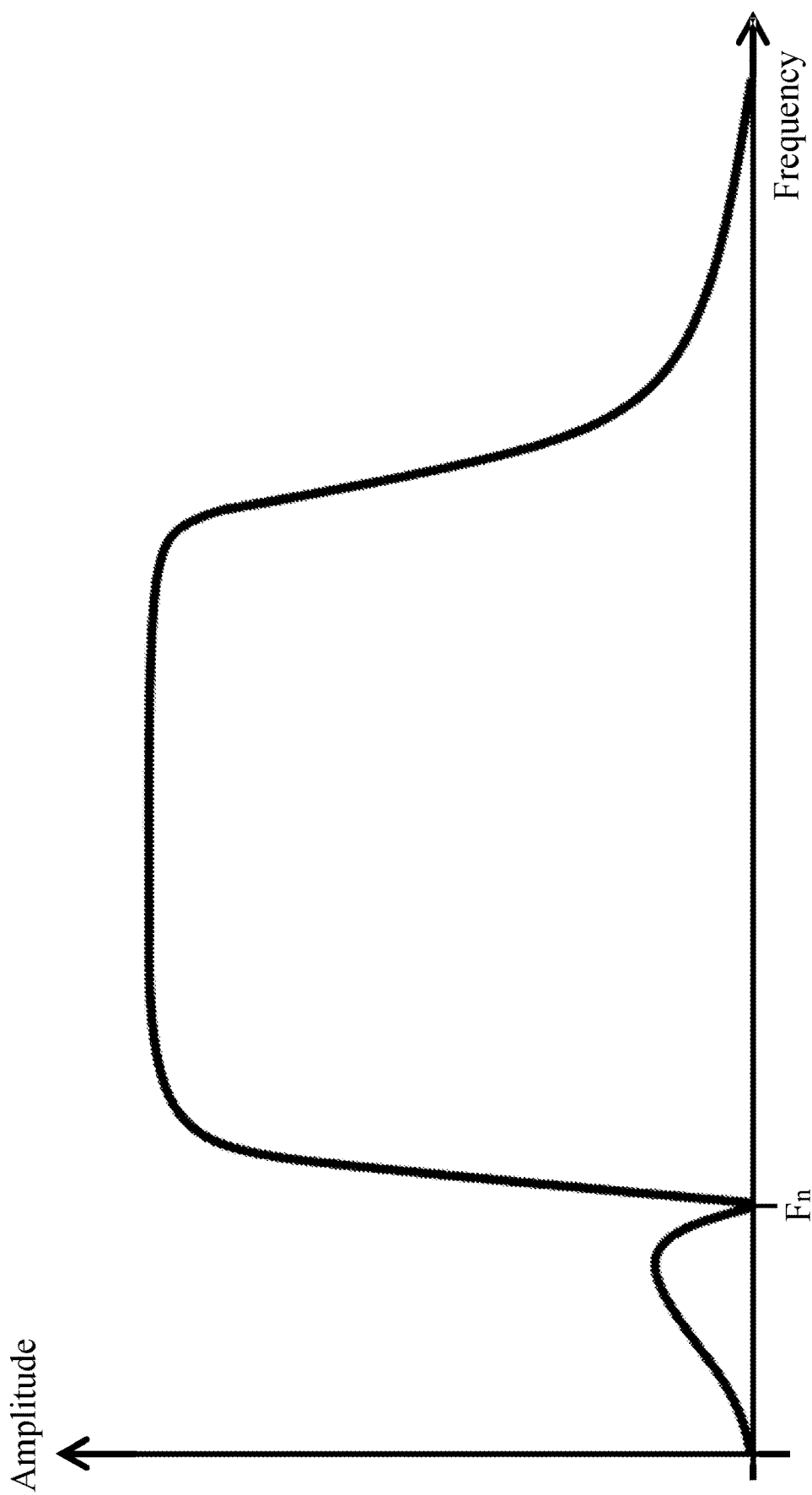
FIG. 3 shows an illustrative shape of the amplitude characteristic of a passband filter with a narrow stopband.

The input filter 203 may comprise an analog filter, i.e. a filter made of discrete electronic components (such as, for example, resistors, capacitors, and inductors, preferably of a variable type), and/or a digital filter, i.e. a set of instructions implementing a filtering algorithm. Its transfer function may be a combination of a passband transfer function, encompassing the voice band, with a stopband transfer function or with a multi-stopband transfer function, for attenuating one narrowband noise component or a number of narrowband noise components. FIG. 3 shows an example amplitude characteristic of such a transfer function relevant to the single stopband case.

In a first embodiment of the invention the attenuation of the noise interference is achieved only by filtering the audio signal by means of the input filter 203 (FIG. 2). In the case where the motors are running at the same speed, this is achieved by the operation of:

audio acquisition means 101 apt to receive an audio signal carrying voice commands for said aircraft 100 and at least one unwanted noise component;

noise component selector 211 configured for deriving the frequency of said at least one noise component of the noise signal on the basis of the motor control signals received from the flight control means 213, which represents the rotation rate of the motors; it is to be noted that, preferably, the frequency of said noise component is the frequency of the harmonic of the motor rotation rate closest to the lower edge of the voice frequency band and, preferably, outside the voice frequency band; therefore the noise component selector 211 preferably derives the motor rotation rate from the motor control signal received from the flight control means 213 and computes the frequency of the noise component to be attenuated according to the above criteria; however, the narrow stopband characteristic may also have its stopband in the voice band;

filters setting means 207 configured for setting data defining at least one stopband characteristic of an input filter 203, wherein the stopband of said at least one stopband characteristic includes said selected frequency or an harmonic thereof; assuming, for instance, that the input filter 203 is implemented by a fixed passband filter cascaded with a notch filter, the filters setting means 207 simply set the filter notch frequency; however, the skilled person knows other ways to implement the input filter 203;

input filter 103 configured for implementing said at least one stopband characteristic and filtering said audio signal; it is to be noted that the stopband characteristics may be implemented in combination with other filtering characteristics (e.g. high-pass, band-pass, or others);

speech conversion means 206 apt to convert an audio signal, carrying voice commands, into a command signal for said flight control means 213.

The speech conversion means 206 may be configured to generate the control signal on the basis of said filtered audio signal by executing a set of instructions implementing a speech recognition algorithm, such as an algorithm reproducing the operation of a Neural network appropriately trained, preferably of the Deep Neural Network (DNN) type. In fact, using a neural network, it is possible to overcome the lack of audio signal entailed by the filtering needed to remove the noise generated by motors and propellers, even if the filtering characteristics vary according to the motors rotational speed.

This allows controlling the aircraft 100 using only the voice, without using a remote control as in the state of the art. In this way, the security of the aircraft 100 is advantageously improved and the oscillations/vibrations of the aircraft caused by inexperienced users are advantageously reduced, so as to render the quality of the images captured by the video capture means independent of the user's piloting skills.

More in detail, the recognition algorithm reads the filtered audio signal that represents a voice command (such as "forward", "back", "right", "left", "stop" or "turn to the left", "rotates to the right", "slides to the left", "slides to the right" or the like) imparted by the user of said aircraft and outputs a control signal that, as described above, defines an attitude and/or movement and/or an aircraft orientation, such as an inclination of the aircraft along its axis and/or a movement along a particular direction and/or an orientation towards a particular direction (e.g. expressed in degrees measured clockwise from North). It should be noted that such a voice command is preferably encoded in a digital audio encoding format (such as WAV, MP3 or other) so it can be processed by digital processing media.

When the aircraft engines do not operate at the same speed, the noise component selector 211 may derive a noise component frequency for each of them or take an average in the case of close frequency values.

Accordingly, the filters setting means 207 may set data for the relevant filter characteristics and the input filter 103 will implement the relevant stopbands.

A variant of the above described embodiment takes into account that the relationship between the motor control signal received from the flight control means 213 and the actual rotation rate of the controlled motor is somewhat loose. According to this variant, the selection of the frequency of the noise component to filter out further comprises the acquisition of the noise signal coming from the environment surrounding the aircraft 100 by the noise acquisition means 102, while said noise component selector 211 is configured for setting the frequency of said noise component on the basis of the motor control signal and/or on the basis of at least one characteristic of the noise signal that said noise component selector 211 detects. Said characteristic of the noise signal may be a comb of tones, an expected sequence of tones, or something else. In particular, it may be a high-level, narrowband component of said noise signal, e.g. the highest narrowband component or a subharmonic thereof. Therefore, the frequency of the noise component to filter out may be selected according to a coarse indication given by the motor control signal and a refinement derived from a characteristic of the noise signal; alternatively it may derived from a characteristic of the noise signal only.

A second embodiment of the invention comprises the features of the first embodiment with its variants, as above described, with the addition of a noise cancellation technique, which consists in producing a noise signal equalized to the noise component contained in an audio signal and subtracting such equalized noise component from the audio signal. This cancellation technique is achieved by the operation of filters setting means 207 configured for additionally setting data defining a passband characteristic that, in its passband, includes the frequency of the selected noise component; the additional data are set on the basis of a frequency (selected by the noise component selector 211) of at least one noise component and/or its harmonics;

noise component filter 209 and audio component filter 208 configured for implementing said passband filter and extracting, respectively, at least one component from the noise signal and a corresponding component from the audio signal coming from the input filter 203;

noise equalization processor 210 configured for setting data defining a delay and a noise equalization transfer function of a filter equalizing the noise part contained in said at least one component extracted from said noise signal to the noise part contained in said corresponding component extracted from said audio signal coming from the input filter 203, on the basis of the signal components extracted by the noise component filter 209 and the audio component filter 208;

delay filter 204 configured for implementing said delay, which is set by said noise equalization processor (210); this delay should compensate for the delay that the noise component extracted from the noise signal undergoes, through the equalization filter (212), minus the delay that the audio filter 203 introduces on the audio path; in the case where this difference gives a negative value, the noise equalization processor 210 sets this delay to zero and adds a corresponding delay to the noise equalization transfer function;

equalization filter 212 configured for implementing the filter transfer function defined by the noise equalization processor 210;

cancellation means 205 configured for reducing, in the audio signal delayed by said delay filter 203, the energy of the unwanted noise component, on the basis of the output of the noise equalization filter 212.

With this second embodiment of the invention, the reduction of the noise in the audio signal greatly improves. In fact, the noise equalization processor 210 may define a number of points of the transfer function equalizing the noise component of the noise signal to the noise component of the audio signal and interpolate those points to provide the equalization over the entire voice band or a large part thereof.

Figure 4:
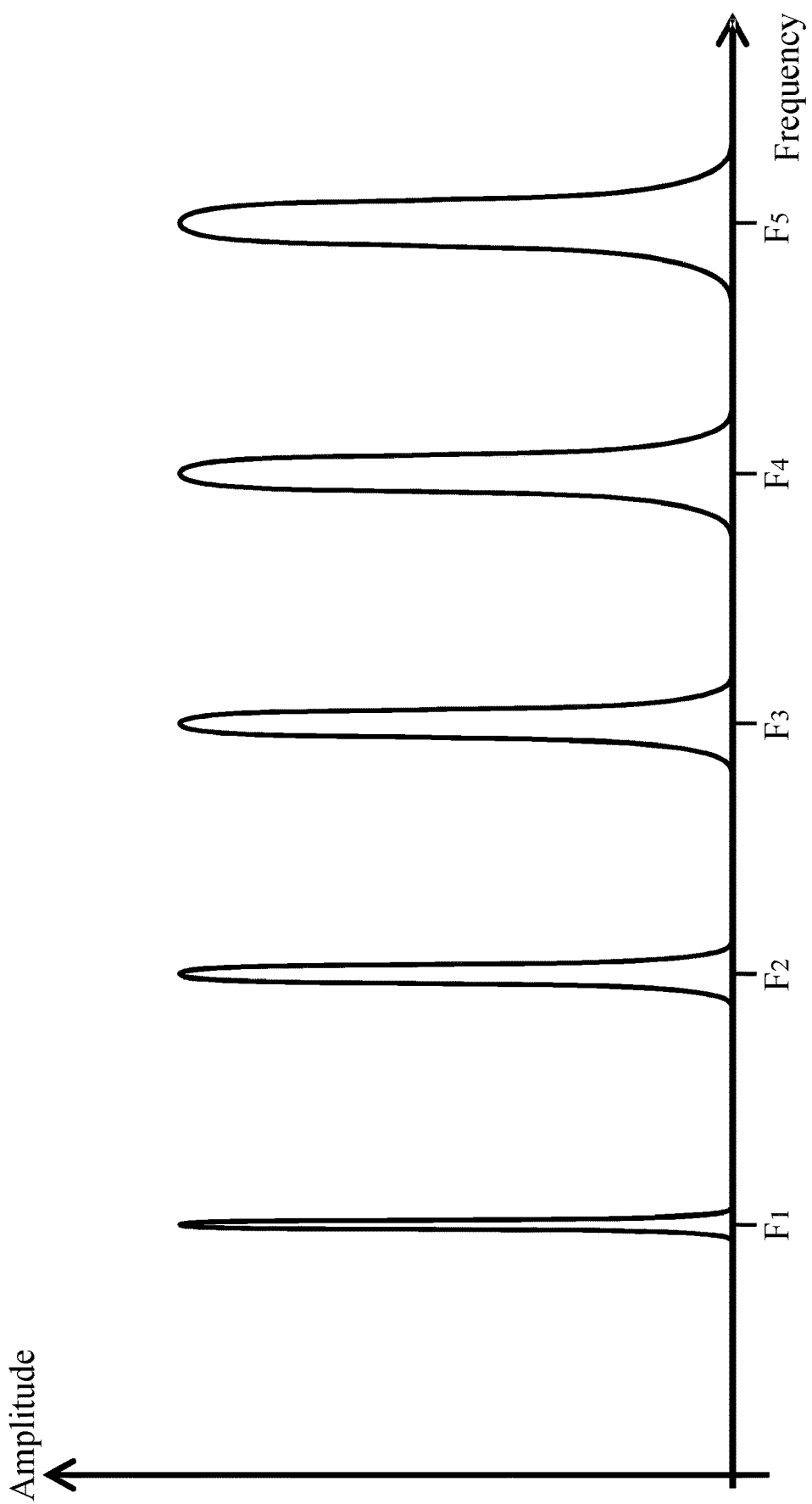
FIG. 4 shows an illustrative shape of the amplitude characteristic of a multi-passband filter with equally spaced passbands and constant fractional bandwidth.

In a variant of the second embodiment of the invention the passband filter characteristic may be a multi-passband with the passbands equally spaced to cope with the harmonics of a fundamental frequency. Moreover, the passbands of the multi-passband characteristic may have the same fractional bandwidth (the ratio of the width of a frequency band to the band center frequency) to accommodate the possible frequency shift and jitter that may affect signal components proportionally to their ordinal number. This case is qualitatively illustrated in FIG. 4.

The same applies to the stopband filters, mainly dealt with in the first embodiment of the invention: multi-stopband filter may be defined with stopbands equally spaced and/or having a same fractional bandwidth.

In another variant of the second embodiment, the data defining a delay and a noise equalization transfer function are set, by the noise equalization processor 210, on the basis of the signal components extracted by said noise component filter 209 and said audio component filter 208 and/or on the basis of said noise signal and/or said audio signal coming from the input filter 203. By comparing and analyzing both signal at various frequencies, the noise equalization processor 210 may better define the equalization transfer function over the entire voice band or a large part thereof.

On the basis of the clean audio signal obtained at the output of the cancellation means 205, as explained above the speech conversion means 206 generate a control signal for the flight controls means 213 performing the steps of
executing a set of instructions implementing a speech recognition algorithm, by converting the audio signal into a bit string, and
generating the control signal based on said bit string.

What is described above, with reference to the annexed figure, defines not only a multi-rotor aircraft 100 controlled by voice command, but also an audio capture device capable of capturing an audio signal carrying voice commands and transmitting said commands, converted into suitable control signals, to a controlled apparatus.

When the aircraft 100 is in an operating condition, the assembly of elements shown in FIG. 2 executes a method for remote control of the aircraft 100 comprising the following phases:

a. a frequency selection phase, wherein, by means of a noise component selector 211, the frequency of at least one noise component of a noise signal is selected on the basis of the control signal of a first motor, which represents the rotational speed of said first motor that is comprised in the aircraft 100;

b. a filters setting phase, wherein a first frequency band is set by means of filters setting means 207 on the basis of said selected frequency or an harmonic thereof;

c. a filtering phase, wherein an audio signal acquired by audio acquisition means 101 is filtered by an input filter 203 featuring a stopband filter characteristic according to said first frequency band, so as to reduce the energy of at least one component of said audio signal having a frequency contained in said first frequency band and generate a filtered audio signal;

d. a command generation phase, wherein a command signal is generated, by means of speech conversion means 206, on the basis of said filtered audio signal, wherein said command signal defines an attitude and/or a movement and/or an orientation of the aircraft 100;

e. a control transmission phase, wherein said command signal is transmitted to flight control means 213 for controlling the flight of said aircraft 100.

In combination with the above-described features, the assembly of elements shown in FIG. 2 may execute the following steps:
acquiring, by means of audio acquisition means 102, a noise signal representing the environmental noise surrounding said aircraft 100;
setting the frequency of at least one component of said noise signal, on the basis of said motor control signal and/or at least one characteristic of said noise signal that said noise component selector 211 detects in said noise signal.

A particular case of the method is the one in which said at least one characteristic of the noise signal is the frequency of a high-level, narrowband component of the noise signal.

A further improvement of the method is the addition of a noise cancellation technique, which consists, as said above, in producing a noise signal equalized to the noise component contained in the corresponding audio signal, and subtracting such equalized noise signal from the relevant audio signal. This cancellation technique is achieved by executing the following phases in place of the above filtering phase c c1—noise component extraction phase, wherein at least one component is extracted from the noise signal by means of a noise component filter 209 implementing said bandpass filtering characteristic, and a corresponding component is extracted from said filtered audio signal by means of an audio component filter 208 implementing said bandpass filtering characteristic;

c2—equalization computation phase, wherein it is computed, by means of a noise equalization processor 210, on the basis of said extracted components and/or said noise signal and/or said filtered audio signal, a delay and a noise equalization transfer function of a filter equalizing at least the noise part contained in said at least one component extracted from said noise signal to the noise part contained in said at least one component extracted from said filtered audio signal;

c3—delay phase, wherein said filtered audio signal is delayed by said delay computed in the previous phase by means of a delay filter 204;

c4—noise equalization phase, wherein said noise signal acquired by said noise acquisition means 102 is processed according to said noise equalization transfer function by means of a noise equalization filter 212;

c5—cancellation phase, wherein in said delayed audio signal the energy of said at least one component extracted from said noise signal by means of a noise component filter 209 is reduced by means of cancellation means 205 on the basis of at least said noise signal processed by said noise equalization filter (212).

In a variant of the method, the stopband filter characteristic and/or the passband filter characteristic is a multiband characteristic, wherein the stopbands of a multiple stopbands filter are regularly spaced by a first fixed spacing and/or the passbands of a multiple passband filter are regularly spaced by a second fixed spacing.

Moreover, the fractional bandwidth of the stopbands may be a first fixed amount and/or the fractional bandwidth of the passbands may be a second fixed amount.

This solution makes it possible using motors and/or speed controllers according to state of the art, thereby not necessitating the use of speed sensors that would increase weight of the aircraft. In this way, it is possible to control the aircraft 100 using only the voice without using a remote control according to the state of the art, so that it can advantageously increase the safety and reduce the oscillations/vibrations of the aircraft.

In combination with the above-described features, the aircraft may include electronic equipment (the so-called avionics), which may comprise speed controllers capable of controlling engine speeds, flight control means 213, a battery for supplying electrical energy to motors and/or other electronic device or the like.

In a particularly advantageous variant, the above-described electronic devices can be made partly or totally by utilizing the hardware already present in a mobile telecommunication device hosted on board of the aircraft. For example, the battery may be comprised in the mobile telecommunication device; moreover, also the flight control means and/or processing means (e.g. a CPU) can be comprised in the mobile telecommunication device, thereby exploiting the calculation power that can be provided by the microprocessors of the mobile telecommunication device. In this case, the electrical connections between the motors of the aircraft and the electronics comprised in the mobile telecommunication device may be made by means of a suitable plug connector that connects to the output connector provided in the mobile telecommunication device and wiring harness housed in chassis of the aircraft.

In this way, it is advantageously avoided the aircraft weight increase due to the presence of an ad-hoc battery and/or an avionics provided outside the mobile telecommunication device. The gyros and accelerometers required to control the flight of the aircraft may also be those already comprised in said mobile telecommunication device, thus reducing the weight of the whole aircraft advantageously. In other words, the mobile telecommunication device comprises a battery suitable for supplying energy to said aircraft, and/or said mobile telecommunication device is configured to control the flight of said aircraft, for example by generating appropriate motor control signals (directed to motors or speed controllers of the motors) on the basis of the accelerometers and/or gyroscopes outputs comprised in said mobile telecommunication device.

This fact produces a reduction in weight that reduces the vibrations generated by the motors, thereby reducing the vibration/oscillation amplitude to which said video acquisition means 21 of said mobile telecommunication device are subjected during flight. In this way, the quality of the images produced by the video capture means 21 are less dependent from the pilot's ability to fly the aircraft 100.

Alternatively or in combination with the above-described features, the aircraft 100 may comprise processing means configured for varying the rotational speed of the aircraft motors in an opposite manner so as to increase the signal-to-noise ratio of the audio signal acquired by the audio acquisition means 101.

In particular, the processing means may be configured for varying the rotational speeds of two or more motors in an opposite manner, i.e. increasing the rotational speed of one of the motors and reducing the rotational speed of another motor, so that the air flow generated by the engine running at a lower speed will be lower and will produce a negligible amount of noise, while the air flow generated by the engine running at a higher speed (compared with the normal one) will produce noise having an advantageously higher frequency. This allows the input filter 203 to filter the signal more effectively, i.e. to obtain a filtered audio signal having a greater signal-to-noise ratio than the solutions according to state of the art, as will be best described in the following example.

In a quadcopter similar to aircraft 100, it is known that, in a hovering flight condition, all motors rotate at similar speeds, for example equal to a rotation rate of 250 Hz, which corresponds to a rotational speed of 15.000 rpm.

If the main frequency of this noise (along with its harmonics) made it impossible to capture audio signals by the audio acquisition means 101 (for example, because the upper harmonic of the motor rotation rate triggers a resonance in the chassis of the aircraft, producing so much noise in the 1-2 kHz band that matches the audio signal band), it is possible to increase the rotational speed of a pair of motors that rotate in the same direction and, at the same time, decreasing the rotational speed of the motor torque that rotates in the opposite direction. In other words, the processing means may also be configured to perform (during a motor speed adjustment phase of the method according to the invention), before setting the filtering interval (i.e. prior to the filtering phase), the following steps:

increasing, by means of a first speed controller, the rotational speed of a first motor;

decreasing, by means of a second speed controller, the rotational speed of a second motor.

This avoids the triggering of frame vibration modes, by improving the acquisition of audio signals with the audio acquisition means 101, so as to enable the control of the aircraft 100 with the voice, even in the presence of a frame having at least one resonant frequency that falls with in the spectrum of audio frequencies, i.e. in the range of 300 Hz to 3.4 kHz.

This makes it possible to capture audio signals by the aircraft, reducing at least part of the noise from the vibration of the chassis. This also makes possible to use a speech recognition algorithm, enabling the control of the aircraft without the use of dedicated remote controls.

Using a quadcopter similar to aircraft 100, the use of this solution produces an aircraft yawing in a particular direction, causing it to rotate around its vertical axis (also referred to as the yaw axis). This movement can be advantageously used to indicate to the user of said aircraft 100 that the audio acquisition means 101 can capture his/her voice with a higher signal to noise ratio, i.e. can capture the audio signal generated by the user's pressure waves speaking aloud.

It should be noted that this solution is also applicable to a coaxial bi-copter, a quadcopter, a hexa-copter, an eight-copter, or the other. Moreover, this solution can be advantageously applied to all multi-rotor aircraft having, for redundancy purposes, two motors coupled above and below the same housing location (e.g. a multirotor in an Y8 configuration). Indeed, in this configuration (and also in the hexa-copter and octocopter configurations) it is also advantageously possible to avoid the aircraft yawing, because it is possible to balance the reaction torque generated by using the (redundant) aircraft motors.

In another embodiment, the aircraft, which may comprise all the features described above for all the previous embodiments, further comprises source localization means (e.g. a microcontroller configured for controlling the direction of a directional microphone and/or a camera configured for recognizing the user and generating positional data on the basis of the user position in an acquired image) configured for performing (during a spatial selection phase) the following steps:

identifying, on the basis of signals received from said audio acquisition means 101 and/or other audio receiving means, a position in a space of a source that produces pressure waves generating said audio signal;

generating a pointing control signal on the basis of said position.

More in details, the audio acquisition means 101 comprise a beam forming network configured for selecting voice commands in said space on the basis of said pointing control signal, wherein said beam forming network receives two or more inputs from distinct microphones, preferably microphones producing a pulse density modulation (PDM) output signal, and produces an output audio signal resulting from the selection of the portions of the audio signal produced by the pressure waves coming from the source position (identified during the spatial selection phase).

In this way, on board the aircraft it is possible to acquire audio signals carrying voice commands and translate the voice commands into control signals for the flight control means, so as to render the quality of the images captured by the video capture means independent of the user's piloting skills.

There are obviously many possible variants to the embodiments described above.

Some of the possible variants have been described above but it is clear to skilled person that, in the practical implementation, there are other forms of realization, with different elements that can be replaced by other technically equivalent. The present invention is therefore not limited to the illustrative examples described herein, but it is subject to various modifications, improvements, replacement of parts and equivalent elements without departing from the basic inventive idea as specified in the following claims.

The invention claimed is:

1. A multi-rotor remote controlled aircraft for capturing audio and/or video signals, comprising:

at least a first motor that can be controlled by a motor control signal and coupled to a first propeller, which is capable of generating a thrust for making said aircraft flying, flight control means adapted to receive a command signal defining an attitude and/or a movement and/or an orientation of the aircraft, and to output at least one control signal for controlling said at least one motor on the basis of said command signal, audio acquisition means adapted to receive an audio signal carrying a voice command for said aircraft and at least one noise component, noise reduction means for reducing said at least one noise component, comprising:

noise component selector configured for selecting at least one filtering frequency of said at least one noise component of said noise signal on the basis of said at least one motor control signal received from said flight control means, wherein said at least one filtering frequency represents the rotation rate of said first motor, filters setting means adapted to set filtering data defining at least one stopband, wherein said at least one stopband comprises said at least one filtering frequency or an harmonic thereof, input filter configured for filtering said audio signal on the basis of said filtering data, by generating a filtered audio signal, speech conversion means adapted to convert said filtered audio signal, carrying a voice command, into a command signal for said flight control means.

2. The multi-rotor remote controlled aircraft according to claim 1, further comprising noise acquisition means adapted to receive a noise signal coming from the environment surrounding said aircraft, and wherein said noise component selector is also configured for setting the filtering frequency also on the basis of at least one characteristic of said noise signal that said noise component selector detects in said noise signal.

3. The multi-rotor remote controlled aircraft according to claim 1, wherein said filters setting means are adapted to set second filtering data on the basis of said filtering frequency, wherein said filtering frequency defines at least one passband comprising the frequency of said at least one selected noise component, and said noise reduction means further comprise:

noise component filter and audio component filter configured for filtering, respectively, said noise signal and said filtered audio on the basis of said second filtering data, so as to extract, respectively, at least one component from said noise signal and a corresponding component from said filtered audio signal, noise equalization processor configured for setting, on the basis of the signal components extracted by said noise component filter and/or said audio component filter, equalization data defining a delay and a noise equalization transfer function of a filter equalizing the noise part contained in said at least one component extracted from said noise signal to the noise part contained in said corresponding component extracted from said audio signal filtered by said input filter, delay filter configured for adding a delay to the filtered audio signal on the basis of the equalization data, equalization filter configured for equalizing said at least one component extracted by the noise component filter from said noise signal on the basis of the equalization data, cancellation means configured for reducing, in the filtered audio signal delayed by said delay filter, the energy of said at least one noise component, on the basis of at least the output of said noise equalization filter.

4. The multi-rotor remote controlled aircraft according to claim 3, wherein said at least one stopband and/or said at least one passband defines a plurality of bands, wherein the stopbands of a multiple stopbands filter are regularly spaced by a first fixed spacing and/or the passbands of a multiple passband filter are regularly spaced by a second fixed spacing.

5. The multi-rotor remote controlled aircraft according to claim 4, wherein the fractional bandwidth of the stopbands is a first fixed amount and/or the fractional bandwidth of the passbands is a second fixed amount.

6. The multi-rotor remote controlled aircraft according to claim 3, wherein said equalization data are set by said noise equalization processor also on the basis of said noise signal and/or said audio signal filtered by said input filter.

7. The multi-rotor remote controlled aircraft according to claim 1, wherein the filtered audio signal at the input of said speech conversion means represents a voice command given by the user of said aircraft and said speech conversion means are configured to generate a control signal on the basis of said audio signal received at its input by performing the steps of
   executing a set of instructions implementing a speech recognition algorithm, by converting said filtered audio signal into a bit string, and
   generating the control signal based on said bit string.

8. The multi-rotor remote controlled aircraft according to claim 1, further comprising source localization means configured for
   identifying, on the basis of signals received from said audio acquisition means and/or other audio receiving means, a position in a space of a source that produces pressure waves generating said audio signal, and
   generating a pointing control signal on the basis of said position,
   wherein said audio acquisition means comprise a beam forming network configured for selecting voice commands in said space on the basis of said pointing control signal.

9. The multi-rotor remote controlled aircraft according to claim 1, comprising:
   a second motor that can be coupled to a second propeller capable of generating a thrust for making said aircraft flying,
   a first speed controller adapted to control the rotational speed of said first motor,
   a second speed controller adapted to control the rotational speed of said second motor, and
   processing means in communication with said first and second speed controllers for regulating the rotational speed of said first and second motor, wherein said processing means are configured for
   increasing, by means of said first speed controller, the rotational speed of the first motor, and decreasing, by means of said second speed controller, the rotational speed of the second motor.

10. An audio capture device, comprising:
    recording means capable of capturing an audio signal,
    transmission means configured to transmit said audio signal to audio acquisition means comprised in a multi-rotor remote controlled aircraft according to claim 1.

11. A method for remote controlling a multi-rotor aircraft, comprising:
    a. an acquisition phase, wherein an audio signal carrying a voice command for said aircraft and at least one noise component are received by means of audio acquisition means,
    b. a frequency selection phase, wherein, by means of a noise component selector, at least one filtering frequency of at least one noise component of a noise signal is selected on the basis of the control signal of a first motor, wherein said at least one filtering frequency represents the rotational speed of said first motor comprised in the aircraft,
    c. a filters setting phase, wherein at least one frequency stopband is set, by means of filters setting means, on the basis of said at least one filtering frequency or an harmonic thereof,
    d. a filtering phase, wherein an audio signal acquired by audio acquisition means is filtered by an input filter featuring a stopband filter characteristic according to said at least one frequency stopband, so as to reduce the energy of at least one component of said audio signal having a frequency contained in said at least one frequency stopband and to generate a filtered audio signal,
    e. a command generation phase, wherein a command signal is generated, by means of speech conversion means, on the basis of said filtered audio signal, wherein said command signal defines an attitude and/or a movement and/or an orientation of the aircraft,
    f. a control transmission phase, wherein said command signal is transmitted to flight control means for controlling the flight of said aircraft.

12. The method according to claim 11, wherein, during the frequency selection phase, the noise component selector carry out the steps of:
    acquiring, by means of noise acquisition means, a noise signal representing the environmental noise surrounding said aircraft,
    selecting at least one filtering frequency of at least one component of said noise signal also on the basis of at least one characteristic of said noise signal that said noise component selector detects in said noise signal.

13. The method according to claim 12, wherein said at least one characteristic of said noise signal is the frequency of a high-level, narrowband component of said noise signal.

14. The method according to claim 11, wherein, during said filters setting phase, a second frequency band is set, by means of filters setting means, on the basis of said filtering frequency and its harmonics, wherein said second frequency band defines a bandpass, and wherein said method further comprises:
    c1. a noise component extraction phase, wherein at least one component is extracted from said noise signal by means of a noise component filter implementing said bandpass, and a corresponding component is extracted from said filtered audio signal by means of an audio component filter implementing said bandpass,
    c2. an equalization computation phase, wherein it is computed, by means of a noise equalization processor, on the basis of said extracted components and/or said noise signal and/or said filtered audio signal, equalization data defining a delay and a noise equalization transfer function of a filter equalizing at least the noise part contained in said at least one component extracted from said noise signal to the noise part contained in said at least one component extracted from said filtered audio signal,
    c3. a delay phase, wherein said filtered audio signal is delayed by said delay defined in the equalization data, by producing a delayed audio signal,
    c4. a noise equalization phase, wherein said noise signal acquired by said noise acquisition means is, by means of a noise equalization filter, equalized through the noise equalization transfer function defined in said equalization data, by producing an equalized noise signal, c5. a cancellation phase, wherein, in said delayed audio signal, the energy of said at least one component extracted from said noise signal is reduced, by means of cancellation means, on the basis of at least said equalized noise signal.

15. The method according to claim 14, wherein said at least one stopband and/or said at least one passband defines a plurality of bands, wherein the stopbands of a multiple stopbands filter are regularly spaced by a first fixed spacing and/or the passbands of a multiple passband filter are regularly spaced by a second fixed spacing.

16. The method according to claim 15, wherein the fractional bandwidth of the stopbands is a first fixed amount and/or the fractional bandwidth of the passbands is a second fixed amount.

17. The method according to claim 11, comprising a spatial selection phase, wherein a position in a space of a source that produces pressure waves generating said audio signal is identified, by means of source localization means, on the basis of signals received from said audio acquisition means and/or other audio receiving means, and wherein a pointing control signal is generated, by means of said source localization means, on the basis of said position, and wherein, during the acquisition phase, said audio signal is processed, by means of a beam forming network configured on the basis of said pointing control signal, in order to select the portions of said audio signal produced by the pressure waves coming from the position identified during the spatial selection phase.

18. The method according to claim 11, comprising a motor speed adjustment phase, wherein the rotational speed of the first motor is increased by means of a first speed controller, and a rotational speed of a second motor comprised in said aircraft is decreased by means of a second regulator of speed, and wherein said motor speed adjustment phase is performed before the frequency selection phase.

19. A computer program product which can be loaded into the memory of an electronic computer, and which comprises portions of software code for executing the phases of the method according to claim 11.

* * * * *